United States Patent [19]

Hinman

[11] Patent Number: 4,756,812

[45] Date of Patent: Jul. 12, 1988

[54] ELECTRICAL CONNECTOR AND CLAMP MECHANISM FOR ECM WORKPART SHAFT

[75] Inventor: Edmund R. Hinman, Monroe, Conn.

[73] Assignee: Airfoil Textron Inc., Lima, Ohio

[21] Appl. No.: 37,888

[22] Filed: Apr. 13, 1987

[51] Int. Cl.$^4$ .................. B23H 3/00; B23H 9/00
[52] U.S. Cl. .................. 204/212; 204/224 M; 204/279; 204/297 R
[58] Field of Search ............ 204/212, 224 M, 297 R, 204/279

[56] References Cited

U.S. PATENT DOCUMENTS

| | | | |
|---|---|---|---|
| 3,060,114 | 10/1962 | Sanders | 204/129.5 X |
| 3,272,732 | 9/1966 | Faulkner | 204/297 R |
| 3,288,699 | 11/1966 | Trager et al. | 204/224 M |
| 3,309,294 | 3/1967 | Goodwin | 204/129.35 |
| 3,450,618 | 6/1969 | Sutton | 204/224 M X |
| 3,459,645 | 8/1969 | Wilson et al. | 204/297 R X |
| 3,461,059 | 8/1969 | Krueger | 204/297 R |
| 3,523,876 | 8/1970 | Stark et al. | 204/129.1 |
| 3,573,188 | 3/1971 | Williams et al. | 204/212 X |
| 3,664,947 | 5/1972 | Bass | 204/297 R |
| 3,714,017 | 1/1973 | Stark et al. | 204/284 |
| 3,803,009 | 4/1974 | Kawafune et al. | 204/224 M X |
| 3,970,538 | 7/1976 | Lucas | 204/224 M |
| 4,052,284 | 10/1977 | Schrader | 204/224 M |
| 4,057,475 | 11/1977 | Schrader | 204/129.1 |
| 4,167,462 | 9/1979 | Schrader et al. | 204/129.25 |
| 4,256,555 | 3/1981 | Wilson et al. | 204/225 X |
| 4,387,014 | 6/1983 | Stengel | 204/212 |
| 4,504,721 | 3/1985 | Inoue | 204/224 M X |

Primary Examiner—Donald R. Valentine
Attorney, Agent, or Firm—Edward J. Timmer

[57] ABSTRACT

A workpart to be the anode for electrochemical machining by a cathode tool is disposed on a shaft having a free end. An electrical coupling housing is disposed on the free end for movement thereon between electrical contact and non-contact positions. A stop extends axially from the free end of the shaft on a connector rod. A fluid actuated piston/cylinder assembly is disposed on the connector rod between the electrical coupling housing and stop. When the piston is actuated, it extends to abut the stop and, as a result of the reaction force, causes the cylinder housing to bias the coupling housing in the opposite direction from piston movement to the electrical contact position to effect electrical connection between the coupling housing and free end of the shaft.

The workpart shaft includes a peripheral toothed portion driven by a pinion gear to index the shaft and workpart thereon. A caliper type clamp mechanism on the yoke member supporting the workpart shaft is disposed to clamp sides of the driven portion after the shaft and workpart are in indexed position for ECM'ing.

25 Claims, 4 Drawing Sheets

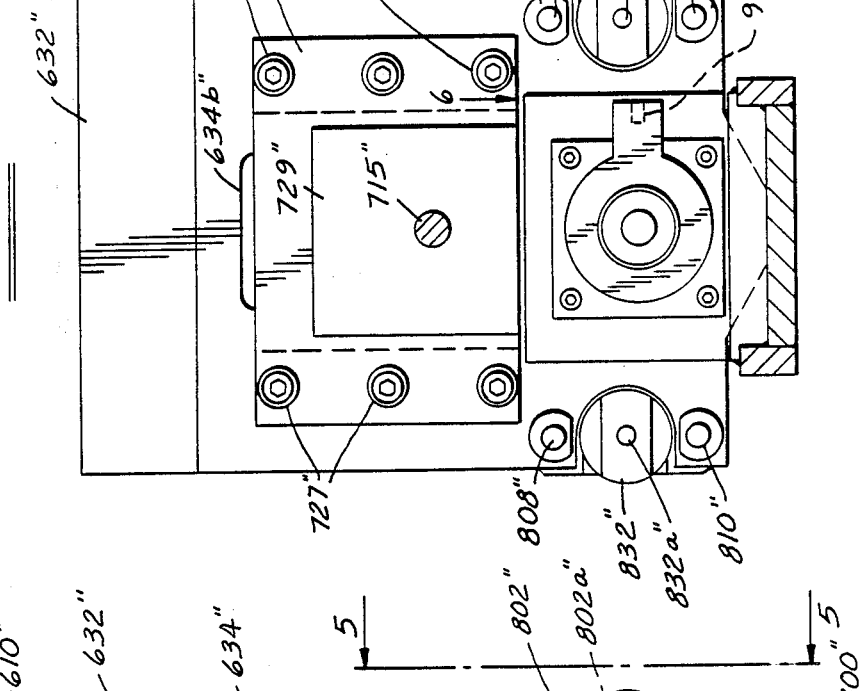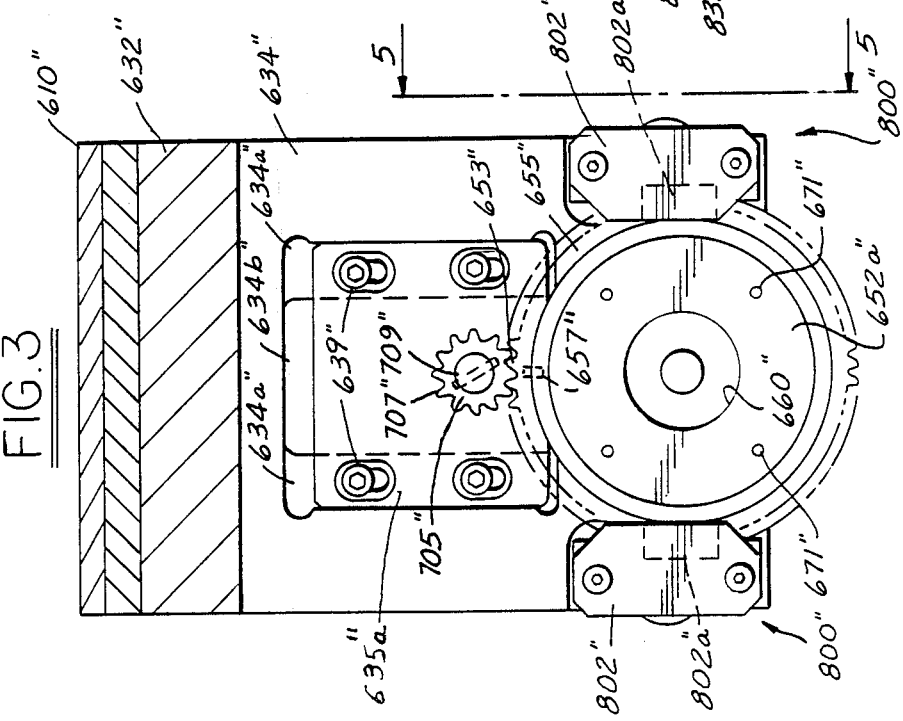

ELECTRICAL CONNECTOR AND CLAMP MECHANISM FOR ECM WORKPART SHAFT

FIELD OF THE INVENTION

The invention relates to machines and methods for fixturing a workpart and establishing electrical contact therewith for electrochemically machining the workpart and, in particular, for electrochemically machining a workpart having a central hub with rotational symmetry mounted on an indexable rotary support and radially projecting appendages, such as airfoils, spaced circumferentially around the hub periphery.

BACKGROUND OF THE INVENTION

Electrochemical machining (ECM) is a well known process for machining metallic based workparts and in the past has been employed to machine complex airfoil shapes on individual blades and complex airfoil blades attached to a central cylindrical hub and extending radially therefrom around its periphery.

ECM apparatus for machining individual airfoils projecting from the central hub of an integral bladed gas turbine engine rotor or wheel is shown in the Stark et al U.S. Pat. No. 3,523,876 issued Aug. 11, 1970; the Stark et al U.S. Pat. No. 3,714,017 issued Jan. 30, 1973; and the Kawafune et al U.S. Pat. No. 3,803,009 issued Apr. 9, 1974. In these patents, the airfoils are completely machined by the ECM process out of a cylindrical blank or disc of material.

The Trager U.S. Pat. No. 3,288,699 issued Nov. 29, 1966 illustrates an ECM apparatus for machining in simultaneous fashion multiple airfoils integral on a turbine wheel blank or disc wherein during axial advance of the cathode the workpart (turbine wheel blank) is rotated through a selected angle to impart a curve to the airfoils as they are formed by the cathode.

The Lucas U.S. Pat. No. 3,970,538 issued July 20, 1976 describes an ECM apparatus for machining oversize leading and trailing edges of airfoil blades integrally cast with a central hub to form an integral bladed rotor for a gas turbine engine. A special cathode structure is disclosed to ECM the leading and trailing edges.

Other prior art workers have employed ECM apparatus to machine a plurality of airfoil blades from one piece of elongated stock material or individual airfoils one at a time. For example, the Wilson et al U.S. Pat. No. 4,256,555 issued Mar. 17, 1981 illustrates ECM'ing an individual airfoil shaped blade preform using opposed cathodes which are caused to move toward opposite sides of the blade preform by movable arms or rams on a conventional machine. In the past, a ball screw assembly driven by a servomotor has been employed to drive each ram with the cathode thereon. In the patent, the cathode rams are driven in opposed directions at a 45 degree angle relative to the centerline of the blade. The Goodwin U.S. Pat. No. 3,309,294 issued Mar. 14, 1967 illustrates an ECM apparatus for shaping an individual metallic airfoil blade for an axial flow compressor of a gas turbine engine.

The Schrader U.S. Pat. No. 4,052,284 issued Oct. 4, 1977 illustrates an ECM apparatus for at least partially forming a plurality of airfoils in a workpart. The apparatus includes a plurality of separately movable electrodes, each pair of electrodes being movable along paths defining an acute angle relative to the sides of the workpart. The Schrader U.S. Pat. No. 4,057,475 issued Nov. 8, 1977 describes a ECM method for forming a plurality of airfoils in a single workpiece. The Schrader et al U.S. Pat. No. 4,167,462 issued Sept. 11, 1979 describes a control system for an ECM machine having a plurality of electrodes driven by a plurality of identical hydraulic pumps.

The Sanders U.S. Pat. No. 3,060,114 issued Oct. 23, 1982 discloses an ECM machine and method using a reciprocating cathode structure. The Inoue U.S. Patent issued Mar. 12, 1985, illustrates a multiple axes electrical discharge machine for forming a three dimensional cavity in a workpart.

Copending U.S. patent application Ser. No. 802,404 filed Nov. 27, 1985, of common inventorship herewith describes a resilient electrically conductive clamp through which an indexable workpart carrying shaft passes. The clamp is caused to grip the shaft by a fluid actuated piston carried on the clamp not only to effect electrical contact or coupling but also to clamp the shaft in indexed position. The shaft is indexed rotatably by a D.C. motor through a gear reducer.

SUMMARY OF THE INVENTION

The invention contemplates an electrochemical machine and method for machining a workpart as an anode with a cathode tool with electrolyte therebetween wherein a shaft means is rotatably supported on a support means and carries the workpart in electrically conductive relation thereon. An electrical coupling means is supported on the shaft means for movement axially along the shaft means to a contact position at which the coupling means and shaft means are electrically connected and an actuator means is provided for moving the coupling means on the shaft. Means are provided for electrically connecting the coupling means to a source of electrical power.

In a preferred embodiment of the invention, the actuator means is movable between a stop on the shaft means and the coupling means to move the latter to the contact position.

In a typical working embodiment of the invention, the stop is connected to and spaced axially from the shaft end by a pin or rod and the actuator means comprises a fluid actuated piston means for reacting against the stop and a cylinder housing in which the piston means slides and which cylinder means biases the coupling means to said contact position as a result of the reaction force of the piston engaging the stop. Typically, the electrical coupling means comprises a housing having a sleeve slidably disposed on the shaft end and an axial end wall closing the sleeve. When the housing is biased to the contact position, the end wall of the sleeve abuts an axial end of the workpart shaft for electrical connection.

The invention also contemplates an ECM machine having an improved support means on which a workpart support shaft is rotatably carried and indexed to place a different part of the workpart in position for machining. The workpart support shaft includes a driven portion for rotatably indexing the shaft by a driver member on the support means. The workpart shaft also includes a clamped portion disposed between a caliper type clamp assembly on the support means for clamping therebetween once the shaft and workpart are in desired indexed position. Typically, diametrically opposite portions of the workpart shaft are clamped by the caliper assembly.

BRIEF DESCRIPTION OF THE DRAWINGS

FIG. 3 is a partial elevational view along lines 3—3 of FIG. 2.

FIG. 4 is a partial elevational view along lines 4—4 of FIG. 2.

DESCRIPTION OF BEST MODE OF CARRYING OUT THE INVENTION

FIGS. 1-7 illustrate a support structure 604" and yoke assembly 630" that can be used in lieu of support structure 604 and yoke assembly 630 of copending application Ser. No. 802,404 filed Nov. 27, 1985 now U.S. Pat. No. 4,684,455 of common inventorship herewith, the teachings of which are incorporated herein by reference.

Figure 1:
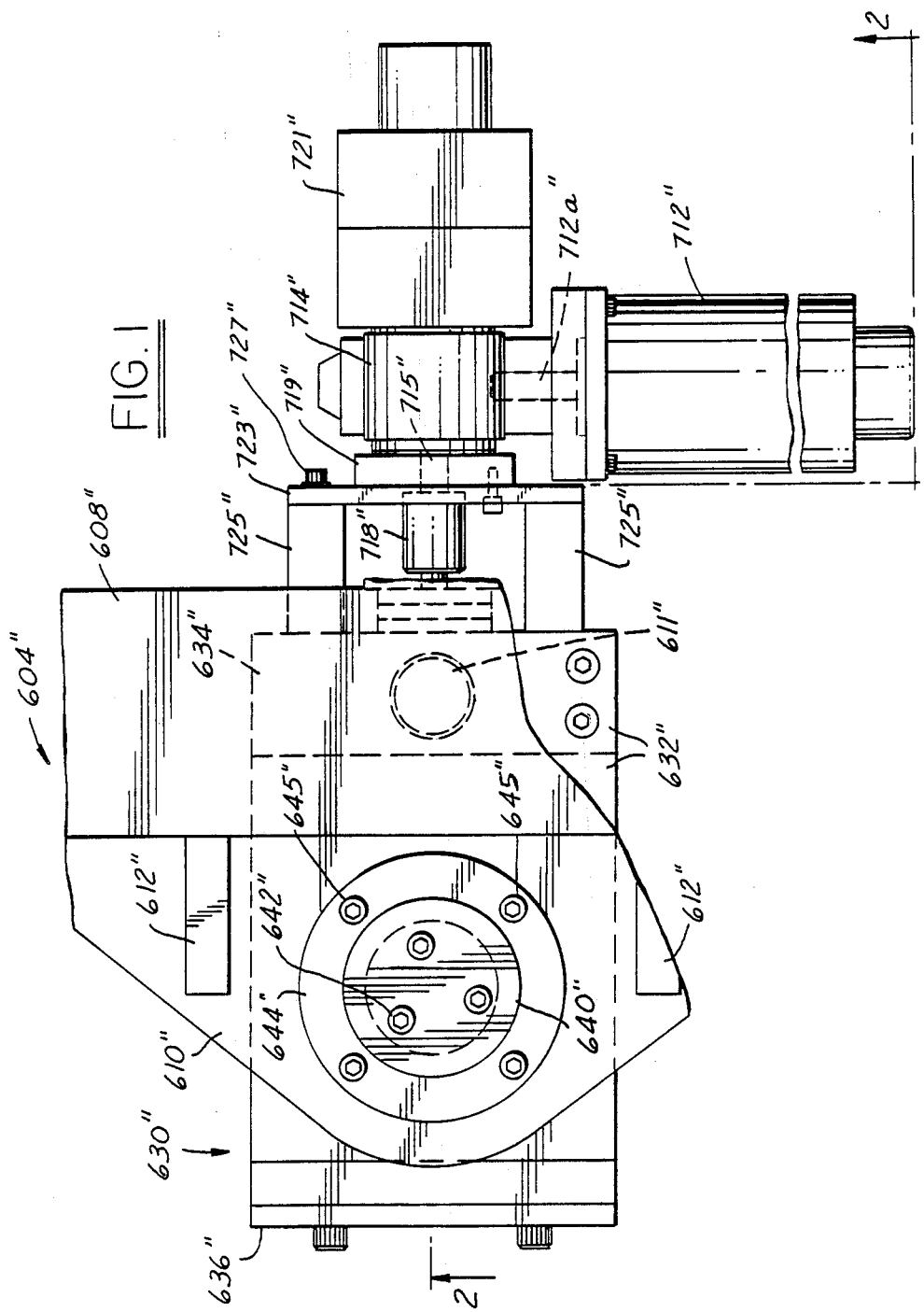
FIG. 1 is a plan or top elevation of the support structure of the invention.
Figure 2:
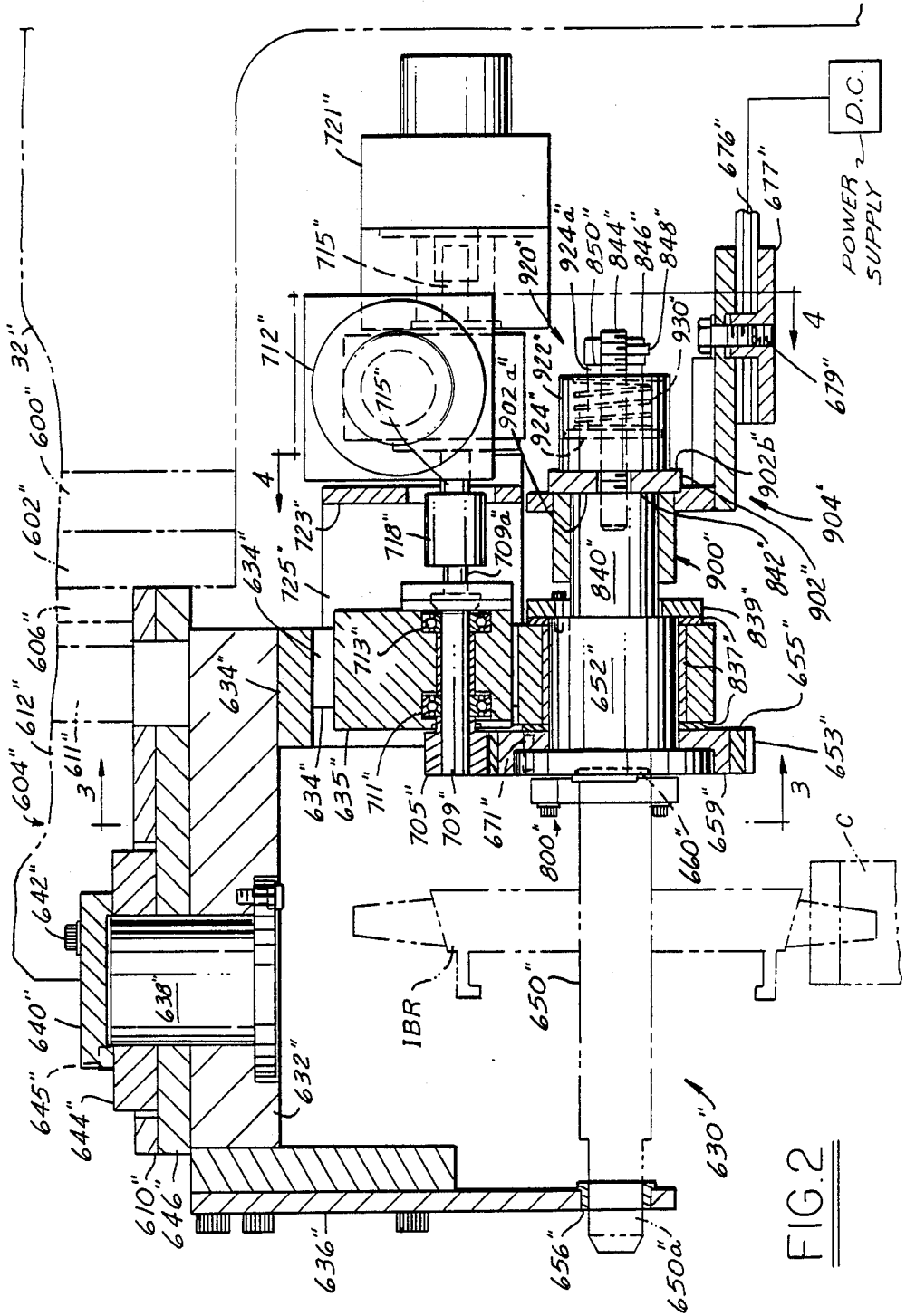
FIG. 2 is a partial view of the support structure taken along lines 2—2 of FIG. 1.
Figure 5:
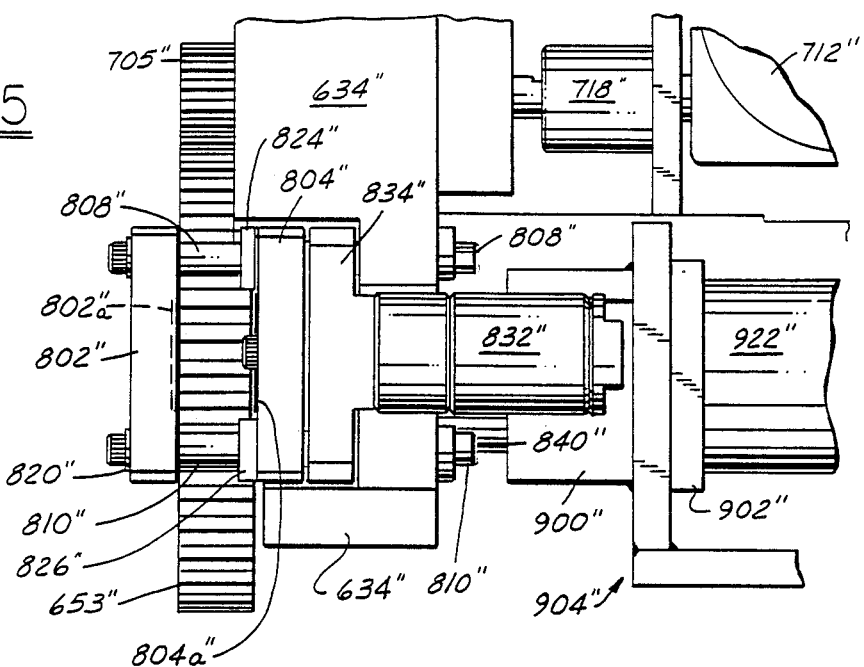
FIG. 5 is an elevational view along lines 5—5 of FIG. 3.

As shown in phantom in FIG. 2, the support structure 604" includes vertical slides 602" (only one shown) which are slidably mounted on vertical slideways 600" on machine frame 32" as explained in the aforesaid application Ser. No. 802,404. Support structure 604" also includes vertical rear support member 606", upper horizontal support member 608" and lower horizontal support member 610". A pair of vertical stiffener members 612" extend toward the front of the machine between horizontal members 608", 610". As a result of being mounted to slides 602", support structure 604" is movable vertically by a ball screw 611" driven by a D.C. servomotor (not shown) but as shown in the aforementioned application Ser. No. 802,404.

The support structure 604" pivotally carries a yoke assembly 630" on which an IBR (integral bladed rotor) is carried. In particular, yoke assembly 630" includes a horizontal yoke member 632", a rear vertical yoke member 634" and a front vertical yoke member 636". As shown best in FIG. 2, the horizontal yoke member 632" is pivotally supported relative to lower horizontal support member 610" by a flanged cylindrical pivot pin 638" extending therethrough as shown. Pivot pin 638" is clamped against angular movement by clamp collar 640" and machine screws 642". Collar 640" engages ring member 644" around the upper end of the pivot pin. The yoke assembly 630" can be angularly adjusted by loosening machine screws 642", rotating the yoke assembly 630", pivot pin 638" and collar 640" the desired degrees and then tightening the machine screws 642" to releasably lock the adjusted position of the yoke assembly. Ring member 644" is affixed to member 610" by machine screws 645".

Positioned between the horizontal yoke member 632" and lower support member 610" and fastened to the latter is an insulator plate 646" of electrical insulating material such as well known G-10 glass/epoxy composite material to prevent electrical current flow to the support structure 604".

The yoke assembly 630" carries and supports an electrically conductive rotary arbor 650" and indexer stub shaft 652" constituting workpart support shaft means between the front and rear vertical yoke members 634", 636" as shown best in FIG. 2. In particular, the front end 650a" of the arbor shaft is received in an electrical insulating bushing 656" in the vertical yoke member 636". The rear end of the arbor is received and releasably retained in socket 660" in copper indexer shaft 652" for incremental rotary indexing of the arbor by the indexer shaft.

An IBR is carried on the electrically conductive arbor 650" in electrically conductive relation thereon as explained in the aforementioned application Ser. No. 802,404 so as to make airfoil A" an anode during ECM'-ing thereof. To this end, the arbor 650" is conductive (copper) to electrical current as is indexer shaft 652". The IBR, being metallic, will conduct the current therethrough to airfoil A" as a result of electrical contact between the arbor 650" and IBR. Clamping collars (not shown) are provided on the arbor to hold the IBR thereon so that the IBR will rotatably index with the arbor.

The indexer shaft 652" is driven in angular increments by pinion gear 705" having peripheral teeth 707" in meshing engagement with peripheral teeth 653" forming a driven portion on end face or flange 652a" of indexer shaft 652". Driven teeth 653" are formed on a ring or annulus 655" affixed by multiple circumferentially spaced radially extending pins 657" (only one shown) to a support ring 659" itself fastened to the flange 652a" by multiple circumferentially axially extending spaced pins 671" FIGS. 2 and 3. Flange 652a" includes annulus 655" and annulus 659". From FIG. 2, it is apparent that pinion gear 705" is fixedly mounted on shaft 709" itself rotatably mounted in auxiliary support block 635" fastened by machine screws 639" through integral flanges 635a" thereon to recessed shoulders 634a" in rear support member 634". Block 635" is disposed in through slot 634b" machined in support member 634". Shaft 709" is rotatably supported by axially spaced apart antifriction bearings 711", 713". Shaft 709" terminates in end 709a". Shaft 709" is driven in rotation by D.C. servomotor 712" having output shaft 712a" driving a conventional gear reducer 714". The output shaft 715" of the gear reducer in turn drives end 709a" of shaft 709" via coupling 718", into which end 709a" and output shaft 715" extend and are mechanically fixedly coupled for movement together. Gear reducer 714", servomotor 712" and rotary transducer 721" are supported by support plate 723" fastened to support arms 725" fixedly extending from rear support member 634" as shown. Machine screws 727" fasten plate 723" to arms 725". Adaptor plate 729" interfaces between plate 723" and gear reducer 714" and is connected to plate 723" by machine screws (one shown).

The output shaft 715" of the gear reducer extends through the gear reducer housing and out the opposite side for mechanical coupling with a conventional rotary transducer 721" that determines angular position of shaft 715" and thus indirectly of the indexer shaft 652".

Once the indexer shaft 652" has been rotatably indexed to the desired position to present airfoil A" for machining by cathode tool C, the indexer shaft is releasably locked or clamped in this position by a pair of caliper clamp assemblies 800" shown in FIG. 3. Each caliper assembly 800" is comprised of identical components as set forth below. As shown best in FIGS. 5-7, each caliper assembly includes a front or first clamping member 802" and rear or second clamping member 804" between which diametrically opposed sections of flange 652a" (formed of annulus 655" and 659") of the indexer shaft are positioned. Each clamping member 802", 804" includes a respective friction pad 802a", 804a" to directly contact and engage the opposite sides of flange 652a" formed by adjacent sections of annulus 655" and 659".

Figure 7:
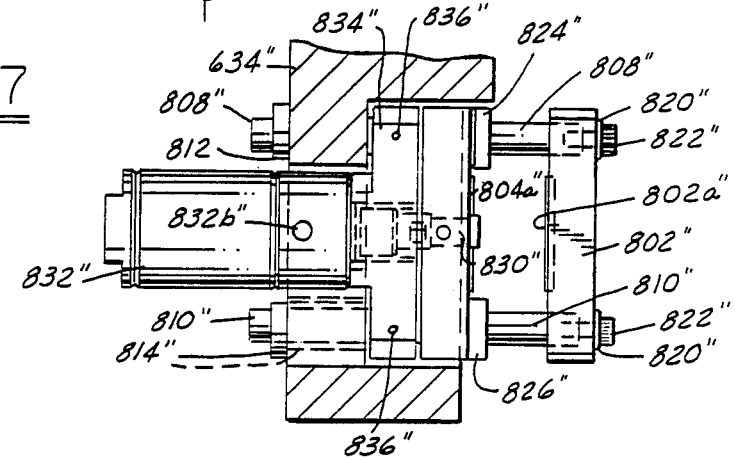
FIG. 7 is a view taken along lines 7—7 of FIG. 6.

The front and rear clamping members are mounted on a pair of stationary shafts 808", 810" extending from rear support member 634" as shown best in FIG. 7. The shafts 808", 810" are mounted in respective bushings 812", 814" in bores in support member 634".

Front clamping member 802" is carried on shafts 808", 810" and abuts end washer 820" beneath the head of machine screw 822" so that rightward (in FIG. 7) movement is limited.

Rear clamping member 804" is slidably mounted on bushings 824", 826" on shafts 808", 810", respectively. The rear clamping member 804" is connected to the output piston or plunger 830" of fluid air cylinder 832". Fluid cylinder 832" is supported on a cylinder mounting plate 834" that is fixedly mounted on shafts 808", 810" by pins 836". Each fluid cylinder includes a clamp port 832a" for connection to a suitable supply of compressed air and an unclamp port 832b" for exhausting fluid.

Figure 6:
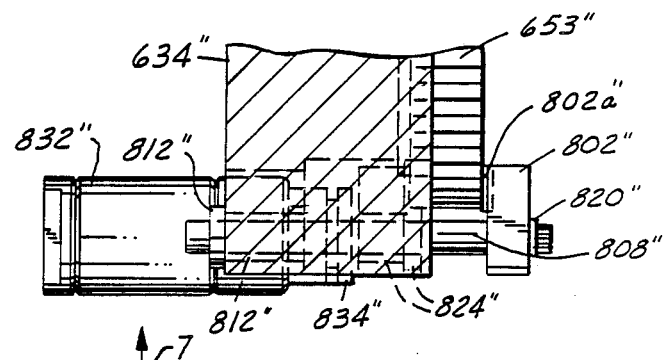
FIG. 6 is a sectional view taken along lines 6—6 of FIG. 4.

As shown best in FIG. 6, when the air or fluid cylinders 832" are actuated, the rear clamping members 804" will move to engage the adjacent side of flange 652a" formed of annulus 655" and 659" and clamp the diametrically opposite sections of flange 652a" therebetween to hold the indexer shaft 652" in the desired indexed position.

When rear clamping members 804" are retreacted, the indexer shaft 652" can be rotatably indexed again to position another airfoil on the IBR in position for machining. Shaft 652" is rotatably supported by bushings 837". Annular plate 839" holds the adjacent bushing in place.

As mentioned hereinabove, the airfoil A" of the IBR is made an anode during electrochemical maching thereof by opposed moving cathodes (one shown). To this end, the indexer shaft 652", which is rotatably mounted in rear support member 634", includes a free end 840" extending axially parallel with its rotational axis. The free end is cylindrical in shape and includes a flat end wall 842" perpendicular to the axis. Extending axially and centrally from the end wall 842" is a threaded connector-stud or post 844" is threaded into and fixed in the end wall 842" while the opposite free end has stop or knob 846" threadably engaged thereon. A set screw 848" is provided to lock the stop 846" in desired position on the stud or post 844". The stop 846" includes an inner annular stop surface 850" in spaced facing relation to end wall 842" of the indexer shaft 652".

Disposed slidably on free end 840" of the indexer shaft is a cylindrical tubular electrical coupling or connector housing 900". The housing 900" includes an annular flat end member 902" disposed adjacent flat end wall 842" of the indexer shaft 652". Depending from the housing 900" is an L-shaped support 904" having a hub 677" fastened thereto by machine screw 679" received tightly in contact between hub 677" and support 904" is a plurality of electrical conductor leads 676" from a D.C. power supply of proper polarity to make the airfoil A" an anode relative to the cathodes.

The housing 900", end member 902", support 904" and hub 677" are made of copper for electrical conductivity purposes. These components are fastened together mechanically and/or by welding/brazing to form a unitary assembly.

Primary electrical contact to the indexer shaft 652" is made by engaging inner side 902a" of member 902" of housing 900" against end wall 842" of the indexer shaft 652". To this end, a so-called pancake air cylinder 920" is disposed on post 844" as shown between annular stop surface 850" and the outer annular side 902b" end of member 902". The fluid cylinder 920" includes an outer housing 922" movably disposed between stop 846" and end member 902" and inner piston 924" that includes hollow piston rod 924a" extending from inside the housing to outside the housing into engagement with annular stop surface 850", FIG. 2. The hollow rod 924a" is disposed around post 844" as shown. When fluid pressure is admitted to bias the left side (in FIG. 2) of piston 924" through port 923", FIG. 4. The piston is moved to the right with hollow piston rod 924a" being forced against annular stop surface 850". This action causes housing 922" to be biased against side 902b" of the end member 902" to cause side 902a" thereof to contact end wall 842" of the indexer shaft 652". This contact effects electrical connection between housing 900" and the electrically conductive indexer shaft 652". In this way, the indexer shaft 652", arbor 650" and IBR electrically contacted thereon are connected electrically to the D.C. power supply (not shown) so that an airfoil A" can be made an anode relative to the cathodes (one shown).

The piston 924" is spring biased to the left (in FIG. 2) by a spring 930". Therefore, so long as fluid pressure is supplied on the left side of piston 924", the electrical contact between end wall 842" and end member 902" will be maintained against bias of the spring. When fluid pressure is reduced or removed from the piston, the spring bias will cause end member 902" to move away from end wall 842" sufficiently to permit rotation of indexer shaft 652" relative to housing 900" which does not rotate with the shaft. Instead, housing 900" tends to float independently on free end 840" of the indexer shaft while the free end rotates incrementally therewithin. Of course, post 844" also rotates within and relative to piston 924" and cylinder 920". Stop 846" rotates relative to the adjacent end 924a" of piston 924".

Cylinder 920" and piston 924" are, as mentioned, a so-called pancake cylinder/piston assembly available commercially from Jergens Inc., Cleveland, Ohio.

While certain preferred embodiments of the invention have been described in detail hereinabove, those familiar with this art will recognized that various modifications and changes can be made therein for practicing the invention as defined by the following claims.

I claim:

1. An electrochemical machine for machining a workpart as an anode comprising a rotatable shaft means on which the workpart is carried in electrically conductive relation for incrementally rotating the workpart, means for incrementally rotating the shaft means to indexed positions, electrical coupling means disposed on the shaft means for axial movement thereon to a position where the coupling means and shaft means are in electrically conductive relation, means for moving the coupling means to said position when said shaft means is at an indexed position and away from said position to permit incremental rotation of said shaft means to another indexed position without rotation of said coupling means thereon, and means for electrically connecting the coupling means to a source of electrical power to make the workpart an anode relative to a cathode tool.

2. The machine of claim 1 wherein said moving means comprises an actuator means movably disposed on the shaft means to move the coupling means to the position.

3. The machine of claim 2 wherein said actuator means is movably disposed between a stop on the shaft means and said coupling means.

4. The machine of claim 3 wherein said stop is fixedly connected to a shaft end by a connector member extending therefrom and said actuator means is movable along the connector member.

5. The machine of claim 4 wherein the connector member extends through the actuator means.

6. The machine of claim 5 wherein said stop is adjustably fixedly positioned on the connector member so that moving force exerted on the coupling means is adjustable.

7. The machine of claim 3 wherein the actuator means comprises a fluid actuated piston means for engaging said stop and a cylinder means in which the piston means is slidably disposed with the cylinder means biasing the coupling means to said position by virtue of reaction to the engagement of the piston means with the stop.

8. The machine of claim 1 wherein the shaft means includes an end wall transverse to its rotational axis and said coupling means includes a housing with a sleeve slidably disposed on the shaft end with the sleeve closed by an end wall that electrically contacts the end wall of the shaft means when the coupling means is moved to the position.

9. The machine of claim 8 wherein said means for electrically connecting the coupling means to said source includes an electrical buss support member extending from the housing.

10. The machine of claim 1 wherein the shaft means includes an arbor means on which the workpart is supported in electrically conductive relation and an indexing shaft coupled at one end mechanically and electrically to the arbor means.

11. The machine of claim 10 including a yoke, with said arbor means disposed between the yoke and said indexing shaft extending remote from the yoke and terminating in a shaft end remote from the yoke and on which the electrical coupling means is disposed.

12. A machine useful for presenting a selected individual appendage of a plurality of such appendages spaced apart around a workpart to a tool means for machining, comprising:
(a) support means, (b) shaft means rotatably disposed on the support means for rotation about an axis to rotate a workpart disposed thereon to present an individual appendage for machining, said shaft means having a driven portion by which the shaft means is rotated and having a peripheral flange portion with opposite sides extending transverse to said axis,
(c) driving means on the support means in driving relation with said driven portion to rotatably index said shaft means,
(d) caliper clamping means on the support means for holding the shaft means in a selected position against rotation, said clamping means including an opposing first clamping member and second clamping member each adjacent a respective one of the opposite sides of the flange portion and movable toward one another to clamp said flange portion therebetween when the shaft means is in an indexed position.

13. The machine of claim 12 wherein the caliper clamping means includes a first clamping member and second clamping member movable on guide means relative to the opposite sides of the flange portion, said guide means extending from the support means.

14. The machine of claim 12 wherein first and second caliper clamping means are disposed in opposite diametrical positions relative to the flange portion.

15. The machine of claim 12 wherein the driven portion comprises a driven gear having peripheral teeth and the driving means comprises a pinion gear with peripheral teeth meshing with those of the driven gear and means for rotating the pinion gear.

16. The machine of claim 12 wherein the support means comprises a yoke having spaced first and second support arms on one of which the shaft means is rotatably disposed.

17. The machine of claim 16 wherein the shaft means includes an arbor having an end rotatably supported on the other of the first and second support arms and another end coupled to the shaft means for rotation thereby.

18. The machine of claim 17 wherein the driving means comprises means for incrementally rotating the shaft means to index the workpart to present a selected individual appendage to the tool means.

19. The machine of claim 12 wherein the first clamping member and second clamping member are guideably carried on a common guide member extending from support means adjacent the opposite lateral sides.

20. The machine of claim 19 wherein the caliper clamping means includes a fluid actuator means for effecting relative movement between the first clamping member and second clamping member on the guide member to clamp the flange portion therebetween.

21. The machine of claim 12 wherein the driven portion comprises peripheral gear teeth on said flange and the driving means comprises a driving gear with peripheral teeth meshing with the peripheral teeth of the flange and means for rotating the driving gear.

22. A method for effecting electrical contact between a hollow electrical coupling housing having an end wall and a rotary indexable workpart drive shaft having a free end with an end wall comprising movably mounting the housing on the free end of the drive shaft with the end wall of the drive shaft and end wall of the housing in spaced facing relation, and moving the housing toward the end wall of the drive shaft to contact the end wall of the housing with the end wall of the drive shaft when the drive shaft is at an indexed position and away from the end wall of the drive shaft during rotary indexing of the drive shaft.

23. The method of claim 22 wherein further including the step of moving an actuator on the free end to move the housing.

24. The method of claim 23 wherein the actuator moves between a stop on the free end and the housing.

25. A machine useful for presenting a selected individual appendage of a plurality of such appendages spaced apart around a workpart to a tool means for machining, comprising:
(a) support means,
(b) shaft means rotatably disposed on the support means for rotation of a workpart disposed thereon to present an individual appendage for machining, said shaft means having a driven gear by which the shaft means is driven in rotation and having a clamped portion, (c) a driving gear rotatably disposed on the support means in driving relation with said driven gear to rotatably index the shaft means and means for rotatably indexing said driving gear, (d) caliper clamping means on the support means for holding the shaft means in a selected position against rotation, said clamping means including a first clamping member and second clamping member on opposite sides of the clamped portion to clamp same therebetween when the shaft is in indexed position.

* * * * *

UNITED STATES PATENT AND TRADEMARK OFFICE
CERTIFICATE OF CORRECTION

PATENT NO. : 4,756,812
DATED : July 12, 1988
INVENTOR(S) : Edmund R. Hinman

It is certified that error appears in the above-identified patent and that said Letters Patent is hereby corrected as shown below:

Column 5, line 60, after "679", insert --and--;

Column 5, line 46, after "844", insert --.  As shown best in Fig. 2, one end of the post 844--

Signed and Sealed this

Fifth Day of May, 1998

Attest:

BRUCE LEHMAN

Attesting Officer       Commissioner of Patents and Trademarks